(No Model.)
L. GATHMANN.
COMBINED CONVEYER AND SEPARATOR.
No. 319,809. Patented June 9, 1885.
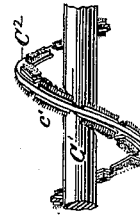
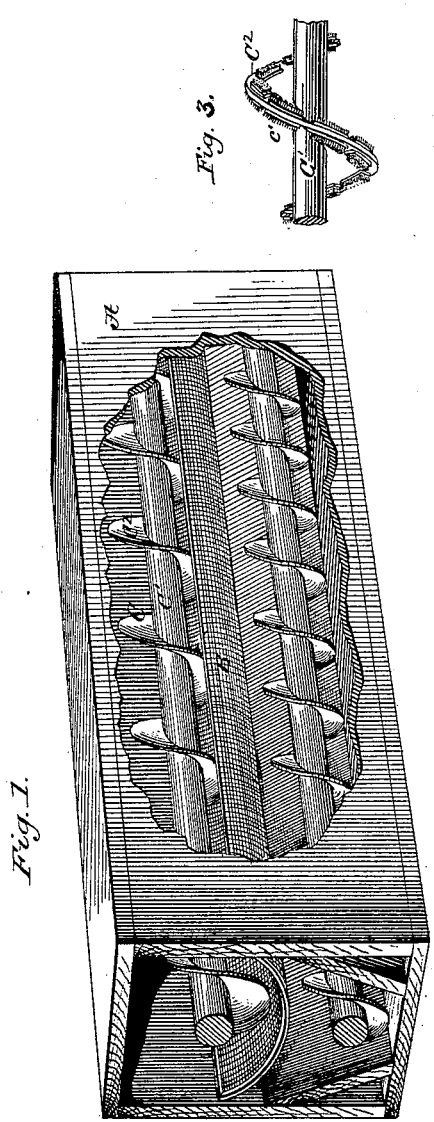
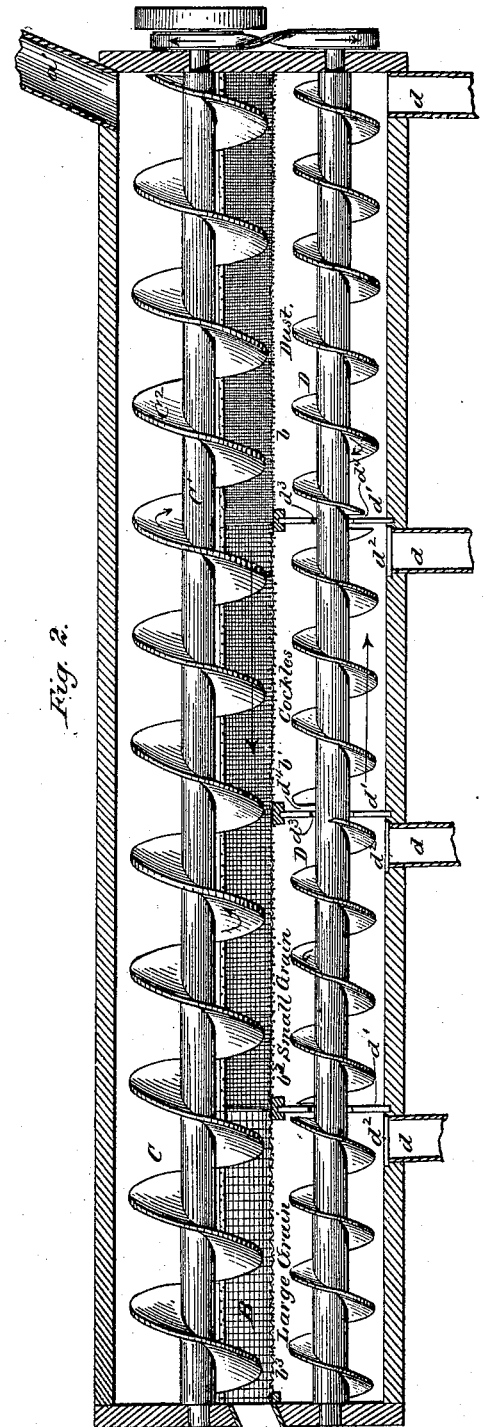
Witnesses:
Jno. W. Stockett.
C. C. Poole
Inventor:
Louis Gathmann
per M. E. Dayton
Attorney

UNITED STATES PATENT OFFICE.

LOUIS GATHMANN, OF CHICAGO, ILLINOIS.

COMBINED CONVEYER AND SEPARATOR.

SPECIFICATION forming part of Letters Patent No. 319,809, dated June 9, 1885.

Application filed January 26, 1883. (No model.)

*To all whom it may concern:*

Be it known that I, LOUIS GATHMANN, of the city of Chicago, in the county of Cook and State of Illinois, have invented certain new and useful Improvements in Combined Conveyers and Separators; and I do hereby declare that the following is a full, clear, and exact description thereof, reference being had to the accompanying drawings, and to the letters of reference marked thereon, which form a part of this specification.

This invention relates to a novel and improved construction in combined conveyers and separators for grain.

The device herein shown as embodying my invention, consists, generally, in a stationary tube or spout permanently divided by a screen or perforated partition into longitudinal upper and lower passages, in each of which a rotary spiral conveyer is located. The screen is graded—that is, it is composed of two or more sections of different sizes of fineness of mesh—and the material passing through said screen is delivered into the lower passage of the spout, from which it is conducted away by suitable discharge-passages, said lower passage of the spout preferably being divided by suitable partitions into separate compartments to receive the material passing from the different sections of the screen, as will hereinafter more fully appear.

For the purpose of increasing the attrition upon the grain and effecting a more perfect separation in the spout, the spiral blade of the conveyer above the screen is preferably provided with brushes adapted to act upon the grain so as to detach dust therefrom, and also so as to more effectually agitate the grain upon the screen.

In the drawings, Figure 1 is a perspective view of a grain-spout or conveyer-box provided with my improvements, two conveyers being visible through the end of the box, and also through an opening in the side, made in the drawing for this purpose. Fig. 2 is a longitudinal vertical central section showing additional features. Fig. 3 is a detail showing a portion of the upper conveyer with a brush upon its spiral blade.

A is a conveyer-spout, and B is a central longitudinal partition separating said spout into upper and lower compartments. Said partition B is made of wire-cloth of any desired size of mesh, of perforated sheet metal, or of any other suitable perforate material, and is secured at its edges to the sides of the spout A by any suitable means. Preferably, said perforate partition B is suspended in a curved or party-cylindric form, as shown in the drawings, to correspond more or less perfectly with the contour of the upper adjacent conveyer-blades.

C is the conveyer, located in the upper chamber of the box A, consisting of the shaft $C'$ and spiral blade $C^2$ affixed thereto. D is a similar conveyer located in the lower chamber of said spout A, and usually of smaller size than the upper conveyer, C. The conveyers may be run in the same or in opposite directions, as desired.

In Fig. 3 a fragment of the upper conveyer, C, is shown, having brushes $c'$ attached to the blade. Said brushes may be arranged to stand with the bristles projecting laterally from the face of the blade, or they may be arranged to stand outward or radially, so as to work in opposition to the netting B.

In Fig. 2 the principle of my invention is extended for the purpose of separating not only the dust, but also the cockles from the grain, and, further, to the separation of small and large grain. These ends are effected in a spout or conveyer-box of suitable length by making the screen-partition in sections of varying size of mesh, and graduated or arranged with reference to such variation. In said figure of the drawings four such sections are shown—the first, $b$, adapted to pass the dust and dirt; the second, $b'$, cockles; the third, $b^2$, small grain, and the fourth, $b^3$, large grain, the larger substances being discharged at the tail-spout $a$. In carrying out this feature of the invention a series of discharge-passages, $d\ d$, are provided, corresponding with the number and location of the screen-sections. The lower chamber is preferably divided into chambers by removable slides $d'\ d'$, located beneath the points where the screen-sections join, and slotted or cut at $d^3$ to embrace the conveyer-shaft. In some situations these slides may be made in halves inserted from two sides of the box and meeting centrally of the conveyer-shaft. To admit the slides $d'$, the blade of the lower conveyer is divided at $d^4$, as shown.

The object of the slides d' is obviously to more perfectly prevent the separated matters from being mixed by the movement of the lower conveyer, or otherwise. Of course the partition-slides d' may be dispensed with and ordinary bottom slides employed, as in other conveyers, but with less satisfactory results. In the present case bottom slides, $d^2$, are provided over the spouts d.

In some situations the lower chamber may be hopper-bottomed and the conveyer D dispensed with.

It is evident that the invention described is calculated, when properly applied, to effect a material saving of space, machinery, and time in many mills.

Heretofore detached or portable grain-scourers have been constructed with a box or casing divided by a horizontal perforated partition into upper and lower chambers, with a rotary spiral conveyer arranged in each chamber and a discharge-spout situated at the end of each one of said chambers, the one to discharge the scoured grain and the other to carry off the dust, which the perforated partition is designed to allow to pass from the upper to the lower chamber. But these devices do not embrace my invention, which is solely applied to the conveyer-fixtures of a mill, and which is designed to provide a practical construction whereby a conveyer heretofore employed exclusively for transferring material from one point or machine to another is also made to perform the additional office of separating the material in the act of thus transferring it, thereby economizing space in the mill and avoiding the use of separate machines for such purpose.

It has, prior to my invention, been proposed, also, to construct a conveyer with a rotary tube formed of graded screen-cloth, or a perforated shell provided upon its inner surface with a spiral blade or rib, for causing the movement of the material longitudinally through the tube, and located above a series of hoppers adapted to receive the material passing through the different parts of the tube. The device herein shown possesses the advantage over the construction last described in enabling an exterior housing, such as is necessary to prevent escape of dust in a construction embracing a rotary perforated tube, to be dispensed with, and, by the absence of a series of hoppers below the tube, in affording a more cheap, simple, and compact structure than is present in the device above referred to.

I claim as my invention—

1. A combined conveyer and separator comprising a spout, a screen suitable for effecting a separation of grain and permanently dividing the spout into upper and lower longitudinal passages, and a series of discharge spouts or passages connected at different points with the lower longitudinal passage in the spout, substantially as and for the purpose described.

2. A combined conveyer and separator consisting of a spout, a graded screen fixed in the spout and dividing the same into upper and lower longitudinal passages, a rotary conveyer located in each of said passages, and suitable discharge-passages connected with the lower passage at points corresponding with the differently-graded portions of the screen, substantially as and for the purpose described.

3. The combination, in a combined conveyer and separator, of a spout with a graded screen fixed in the spout and dividing the same into upper and lower passages, a rotary conveyer located in each passage, partitions dividing the lower passage into compartments corresponding with the differently-graded portions of the screen, and suitable discharge-passages connected with the said compartments, substantially as described.

4. In a combined conveyer and separator, the combination, with the spout A, conveyer C, and screen B, constructed in graduated sections, of the conveyer D, having a divided blade, the slide or slides d', and the spouts d, substantially as and for the purposes set forth.

5. In a combined conveyer and separator, the combination, with a spiral conveyor, C, of a screen, B, and brushes c', attached to the conveyer-blade, substantially as and for the purposes set forth.

In testimony that I claim the foregoing as my invention I affix my signature in presence of two witnesses.

LOUIS GATHMANN.

Witnesses:
CYRUS KEHR,
JESSE COX, Jr.